(12) United States Patent
Valente

(10) Patent No.: US 6,513,116 B1
(45) Date of Patent: Jan. 28, 2003

(54) SECURITY INFORMATION ACQUISITION

(75) Inventor: Luis Valente, Palo Alto, CA (US)

(73) Assignee: Liberate Technologies, San Carlos, CA (US)

( * ) Notice: Subject to any disclaimer, the term of this patent is extended or adjusted under 35 U.S.C. 154(b) by 0 days.

(21) Appl. No.: 09/162,650

(22) Filed: Sep. 29, 1998

Related U.S. Application Data

(63) Continuation of application No. 09/080,571, filed on May 18, 1998, now abandoned.
(60) Provisional application No. 60/046,748, filed on May 16, 1997.

(51) Int. Cl.⁷ .................................................. G06F 1/24
(52) U.S. Cl. ....................................... 713/155; 713/159
(58) Field of Search ................................. 713/155–159; 380/282, 285

(56) References Cited

U.S. PATENT DOCUMENTS

| | | | |
|---|---|---|---|
| 4,035,835 A | | 7/1977 | Poetsch |
| 5,155,847 A | | 10/1992 | Kirouac et al. |
| 5,373,561 A | * | 12/1994 | Haber et al. ................. 713/156 |
| 5,436,673 A | | 7/1995 | Bachmann et al. |
| 5,444,861 A | | 8/1995 | Adamec et al. |
| 5,453,779 A | | 9/1995 | Dan et al. ....................... 348/7 |
| 5,495,610 A | | 2/1996 | Shing et al. |
| 5,497,422 A | * | 3/1996 | Tysen et al. ................. 713/157 |
| 5,541,638 A | | 7/1996 | Story |
| 5,600,364 A | | 2/1997 | Hendricks et al. |
| 5,634,051 A | | 5/1997 | Thomson |
| 5,680,458 A | * | 10/1997 | Spelman et al. ............ 713/277 |
| 5,708,845 A | | 1/1998 | Wistendahl et al. |
| 5,727,129 A | | 3/1998 | Barrett et al. |
| 5,752,042 A | | 5/1998 | Cole et al. |
| 5,754,938 A | | 5/1998 | Herz et al. |
| 5,754,939 A | | 5/1998 | Herz et al. |
| 5,761,306 A | * | 6/1998 | Lewis ........................ 380/282 |
| 5,764,992 A | | 6/1998 | Kullick et al. |
| 5,787,172 A | * | 7/1998 | Arnold ........................ 713/156 |
| 5,796,840 A | * | 8/1998 | Davis .......................... 713/159 |
| 5,808,628 A | | 9/1998 | Hinson et al. |

(List continued on next page.)

OTHER PUBLICATIONS

Bussey H E Et Al: "Service Architecture, Prototype Description, And Network Implications Of A Personalized Information Grazing Service" Multiple Facets Of Integration, San Francisco, Jun. 3–7, 1990 Institute Of Electrical And Electronic Engineers, pp. 1046–1053, XP000164339 see whole document.

(List continued on next page.)

Primary Examiner—Thomas R. Peeso
(74) Attorney, Agent, or Firm—Michael A. Glenn; Kirk D. Wong

(57) ABSTRACT

The invention provides an improved method and system for security information acquisition. A relatively small amount of nonvolatile storage at the client consumer electronic device is used to obtain a chain of trusted root certificates, thus providing each client consumer electronic device with a trustable technique for access to secure communication. The trusted root certificates are provided by one or more TSIPs (trusted security information providers), and are chained together so that a current root certificate can be obtained by the client consumer electronic device, even using an expired root certificate. The client consumer electronic device uses a current root certificate to obtain a SIO (security information object) from the TSIP. The SIO includes information regarding at least one trusted entity, such as a one or more trusted entity certificates, and other trust information. The SIO is digitally signed by the TSIP and can be verified by the client consumer electronic device using the current root certificate.

30 Claims, 3 Drawing Sheets

U.S. PATENT DOCUMENTS

| | | |
|---|---|---|
| 5,809,287 A | 9/1998 | Stupeck, Jr. et al. |
| 5,850,232 A | 12/1998 | Engstrom et al. ............ 345/511 |
| 5,859,969 A | 1/1999 | Oki et al. |
| 5,867,166 A | 2/1999 | Myhrvold et al. |
| 5,870,765 A | 2/1999 | Bauer et al. ................. 707/203 |
| 5,874,967 A | 2/1999 | West et al. .................. 345/435 |
| 5,877,741 A | 3/1999 | Chee et al. .................. 345/113 |
| 5,926,624 A | 7/1999 | Katz et al. |
| 5,936,606 A | 8/1999 | Lie ............................. 345/113 |
| 5,977,960 A | 11/1999 | Nally et al. .................. 345/191 |
| 6,005,574 A | 12/1999 | Herrod ........................ 345/344 |
| 6,009,363 A | 12/1999 | Beckert et al. |
| 6,018,768 A | 1/2000 | Ullman et al. |
| 6,028,583 A | 2/2000 | Hamburg .................... 345/112 |
| 6,047,269 A | 4/2000 | Biffar |
| 6,049,628 A | 4/2000 | Chen et al. |
| 6,049,835 A | 4/2000 | Gagnon |
| 6,104,727 A | 8/2000 | Moura et al. |

OTHER PUBLICATIONS

Wyle M F: "A Wide Area Network Information Filter" Proceedings International Conference Artificial Intelligence On Wall Street, Oct. 9, 1991, pp. 10–15, XP000534152 see the whole document.

Lang K: "NewsWeeder: Learning to filter netnews" Machine Learning. Proceedings Of The Twelfth International Conference On Machine Learning, Tahoe City, CA, USA, Jul. 9–12, 1995, San Francisco, CA, USA, Morgan Kaufmann Publishers, USA, pp. 331–339, XP002046557 see the whole document.

Rosenfeld L B, et al: "Automated Filtering Of Internet Postings" Online, vol. 18, No. 3, May 1994, pp. 27–30, XP000616769 see the whole document.

Yan T W, et al: "Sift—A Tool For Wide–Area Information Dissemination" Usenix Technical Conference, Jan. 16, 1995, pp. 177–186, XP000617276 see the whole document.

* cited by examiner

SECURITY INFORMATION ACQUISITION

CROSS-REFERENCE TO RELATED APPLICATIONS

This application claims priority of the following applications: Provisional Application Ser. No. 60/046,748, filed May 16, 1997, in the name of inventors Luis Valente, Venkatachary Srinivasan, Andreas Atkins and Wei Ling Chu, titled "Client Server Architecture," attorney docket number NAV-008P.

This is a continuation of application No. 09/080,571, filed May 18, 1998 in the name of inventor Luis Valente, titled "Security Information Acquisition", now abandonded.

Each of these applications is hereby incorporated by reference as if fully set forth herein.

The following application also is hereby incorporated by reference as is fully set forth herein: Application No. 08/770,238, filed Dec. 20, 1996, in the name of inventors Wei Yen and Steven Weinstein, titled "Internet Multiplexer for Broadcast and Other Information,"now U.S. Pat. No. 5,991,799.

BACKGROUND OF THE INVENTION

1. Field of the Invention

The invention relates to security information acquisition.

2. Related Art

Secure communication between devices often uses some form of encoding or encryption so that both sender and recipient can trust that their communications are not being interfered with or listened to by an unauthorized third party. One method in the known art for secure communications is public key encryption. In public key encryption, each sender has a key pair, comprising both a public key and a private key. The sender can encrypt messages to prevent unauthorized reading (using the recipient's public key), and can sign messages to prevent undetected tampering (using the sender's own private key). The sender and recipient can each obtain the other's public key from a CA (certification authority). The CA issues certificates, each of which binds a particular public key to a particular owner of that public key.

One problem in the known art is that both sender and recipient trust the CA and trust the certificates issued by that CA. However, each CA can have differing standards and techniques for authenticating the binding between keys and the individual g sender or recipient. Before establishing trusted communication, the sender and recipient each determine which CA to trust for authenticating keys. Each CA distributes a CA root certificate authenticating itself.

This problem is particularly difficult for consumer electronic devices, due to shelf life, the time period the device is likely to remain on the shelf before being sold, and the product life, the time period the device is likely to remain in operation before being disposed of. First, the set of trusted CAs is likely to change during the shelf life and product life of any particular consumer electronic device. Second, each CA root certificate is issued for a limited time (as are all CA certificates), and this limited time may not coincide well with the shelf life or product life. Third, if a CA's root key is compromised, its root certificate should be revoked, and some trusted entity is desired to assume responsibility for revoking compromised CA root certificates. fourth, nonvolatile storage is relatively expensive, making it advantageous to use as little as possible for consumer electronic devices; similarly, whatever data is written into that nonvolatile storage should never become obsolete.

Accordingly, it would be desirable to provide an improved method and system for security information acquisition. This advantage is achieved in an embodiment of the invention in which a relatively small amount of nonvolatile storage is used to obtain a chain of trusted root certificates, thus providing each consumer electronic device with a trustable technique for access to secure communication.

SUMMARY OF THE INVENTION

The invention provides an improved method and system for security information acquisition. A relatively small amount of nonvolatile storage at the client consumer electronic device is used to obtain a chain of trusted root certificates, thus providing each client consumer electronic device with a trustable technique for access to secure communication. The trusted root certificates are provided by one or more TSIPs (trusted security information providers), and are chained together so that a current root certificate can be obtained by the client consumer electronic device, even using an expired root certificate.

The client consumer electronic device uses a current root certificate to verify an SIO (security information object) obtained from the TSIP. The SIO includes information regarding at least one trusted party (such as information regarding at least one trusted CA, such as a CA root certificate), and other trust information. Although the invention is described herein with regard to trust information about CAs, it is also applicable to trust information about other types of trusted entities, such as trusted financial institutions, trusted information providers, or trusted software publishers. The SIO is digitally signed by the TSIP and can be verified by the client consumer electronic device using the current root certificate.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, or other special purpose circuits, and that implementation of the preferred process steps and data structures described herein using such equipment would not require undue experimentation or further invention.

System Elements

Figure 1:
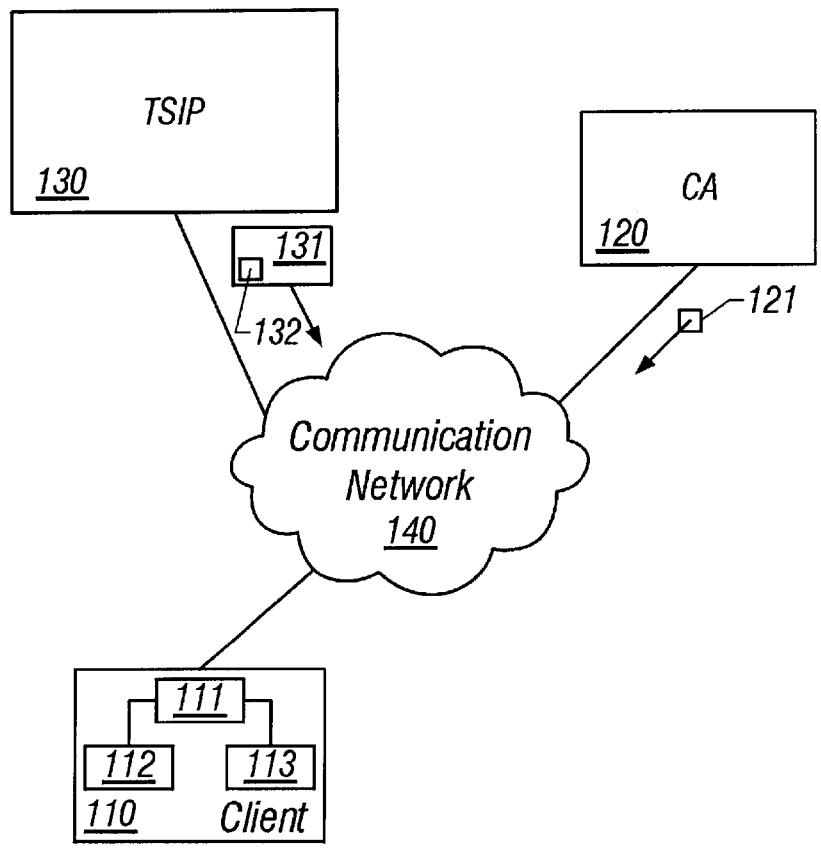
FIG. 1 shows a block diagram of a system for security information acqustion.

FIG. 1 shows a block diagram of a system for security information acquisition.

A system 100 for security information acquisition includes at least one client device 110, at least one certification server 120 such as a CA (certification authority), at least one security information server 130 such as a TSIP (trusted security information provider), and a communication network 140 for communication.

The client device 110 includes a processor 111, a program and data memory 112, and a nonvolatile memory 113, and possibly other elements such as input and output peripherals. In a preferred embodiment, the client device 110 has relatively few processing resources or memory resources, and is designed to use relatively minimal amounts of the nonvolatile memory 113. For example, the client device 110 can comprise a "set-top box" used with a television set for receiving and decoding broadcast information in conjunction with interactive or personalized information.

The certification server 120 includes a physical embodiment of a public or private CA, and includes a set of binding between keys and identified parties. The certification server 120 provides certificates 121, each of which can identify to the client device 110 the binding between a particular public key and a particular identified party. The certification server 120 digitally signs each certificate 121, to assure those client devices 110 trusting that particular certification server 120 that the certificate 121 is accurate and trustworthy. In a preferred embodiment, the certification server 120 verifies that a particular identified party has the right to use a particular public key, such as using techniques stated in a CPS (certification practices statement) for the CA. One example such CPS is publicly available from Verisign, Inc., or on the internet at the URL "http://www.verisign.com/".

In a preferred embodiment, several terms used herein, including "key" or "key pair," "CA" or "certification authority," "encryption" and "decryption," and "digitally signed," refer to those concepts as they are known in the art of public key cryptography, However, alternative embodiments may use other and further forms of authentication and certification, using other forms of cryptography either in addition to or instead of public key cryptography, and are within the scope and spirit of the invention.

Public key cryptography is known in the art of communication. Each key (or key pair) is a pair comprising one public key and one private key. Documents are encrypted by applying an encryption technique using the recipient's public key, and decrypted by applying a decryption technique using the recipient's private key. Documents are digitally signed by applying the same encryption technique using the sender's private key, and digital signatures are verified by applying the same decryption technique using the sender's public key. In a preferred embodiment, the actual digital signature technique is performed with regard to a document digest or secure hash (such as the known functions MD5 or SHA-1), selected responsive to the document and usable to detect any alteration in the document.

Other and further information about public key cryptography can be found in the following reference: "The Public-Key Cryptography Standards (PKCS)" (version 1.5), publicly available from RSA Data Security, Inc., and on the internet at the URL "http://www.rsa.com/rsalabs/pubs/PKCS/".

The certification server 120 also provides at least one particular type of certificate 121, called a "self-authenticating certificate," which is self-signed by the certification server 120. The certification server 120 can provide a self-authenticating certificate 121 for itself, called a "root certificate," which is self-signed by the certification server 120 using the private key counterpart to the public key included in the certificate. The certification server 120 can also provide a certificate 121 for a deputy certification server 120.

In a preferred embodiment, the communication network 140 can include an internet or intranet, or a switching network such as a telephone network. There is no particular need for the communication network 140 to comprise a trusted communication path.

The Security Information Server

The security information server 130 preferably includes a physical embodiment of a TSIP. In alternative embodiments, the security information server 130 may be coupled to a TSIP and provide an online presence for that TSIP.

The security information server 130 provides an SIO (security information object) 131, which includes information about certification servers 120 to be trusted by the client 110. Each SIO 131 can include information indicating a new trusted certification server 120, modifying information about a known certification server 120, or revoking the trustworthiness of a certification server 120.

The security information server 130 also provides a sequence of root certificates 132 to authenticate the TSIP (itself) to the client device 110. Each root certificate 132 is self-authenticating (it is digitally signed by the security information server 130 itself). Root certificates 132 are described in further detail with regard to FIG. 2.

The security information server 130 can also provide certificates 121 for any deputy security information servers 130.

The client device 110 includes in its nonvolatile memory 113 sufficient information to reach the security information server 130 and to obtain trusted information from the security information server 130 (such as a current root certificate 132 or sufficient information to obtain a current root certificate 132). When the security information server 130 provides an SIO 131 to the client device 110, the latter has information about at least one trusted certification server 120. When the trusted certification server 120 provides a certificate 121 to the client device 110, the latter has sufficient information to conduct secure communications using the communication network 140, even when the communication network 140 is not a trusted medium.

Security Information Server Root Certificates

Figure 2:
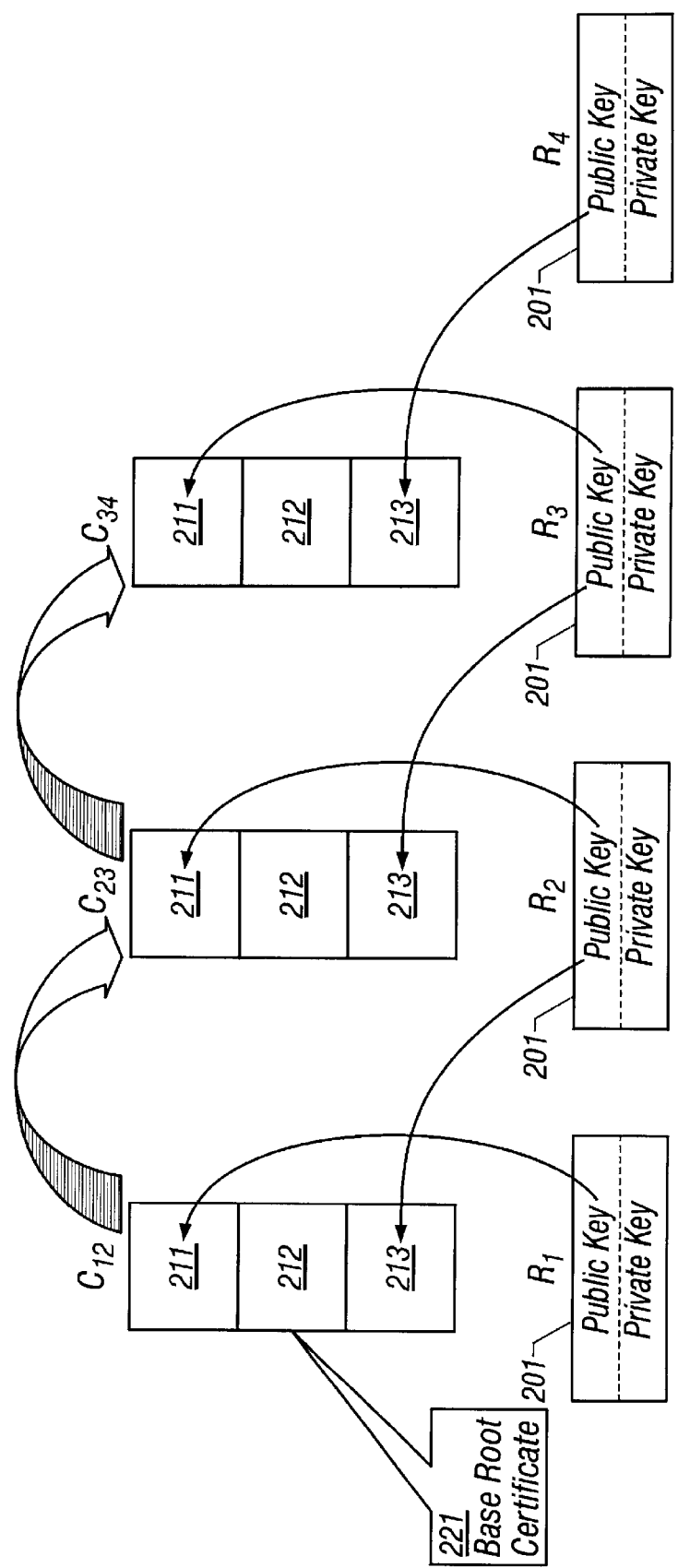
FIG. 2 shows a data block diagram of a chain of root certificates.

FIG. 2 shows a data block diagram of a chain of root certificates.

Root Certificate Generation

The security information server 130 generates two key pairs 201, key pair 201 R1 and key pair 201 R2. Of these, key pair 201 R1 is an active key pair, while key pair 201 R2 is a dormant key pair intended for future use.

Each root certificate 132 is self-authenticated (it is digitally signed by the security information server 130 using its own private key). The root certificate 132 C12 for key pair 201 R1 and key pair 201 R2 includes the following elements:

the public key 211 for key pair 201 R1;
a validity period indicator 212 (including at least an ending date for validity, and preferably including a beginning date for validity); and
a digest 213 (or secure hash) of the public key for key pair 201 R2.

The root certificate 132 is digitally signed by the security information server 130 using the private key for key pair 201 R1.

When the root certificate 132 C12 expires (or in a preferred embodiment, some time before the root certificate 132 expires), the security information server 130 generates a new key pair 201 R3 and issues a root certificate 132 C23 for key pair 201 R2 and key pair 201 R3. The root certificate 132 C23 for key pair 201 R2 and key pair 201 R3 is digitally signed using the private key from key pair 201 R2.

Similarly, if the root certificate 132 C12 is compromised, the security information server 130 generates a new key pair 201 R3 and issues a root certificate 132 C23 for key pair 201 R2 and key pair 201 R3, thus revoking root certificate 132 C12.

Each root certificate 132 $C_{ij}$ for the key pair 201 $R_i$ and the key pair $R_j$ is digitally signed using the private key for key pair 201 $R_j$. Each root certificate 132 $C_{ij}$ for the key pair 201 $R_i$ and the key pair $R_j$ includes a digest 213 for the public key for key pair 201 Rj, creating a chain from the root certificate 132 $C_{ij}$ to a next root certificate 132 $C_{jk}$. In a preferred embodiment, k=j+1 and j=i+1 when root certificate 132 $C_{jk}$ is next in the chain after root certificate 132 $C_{ij}$.

The client device 110 having the certificate 132 $C_{ij}$ is able to determine that the root certificate 132 $C_{jk}$ is trustworthy upon receipt from the security information server 130.

The active root certificate 132 $C_{ij}$ is the last distributed certificate in the chain, is digitally signed using the active key pair $R_i$, and includes a digest 213 for the for the public key for the dormant key pair 201 $R_j$.

Client Use of Root Certificates

The client device 110 records in its nonvolatile storage (preferably a read-only persistent storage such as ROM), a base root certificate 221, comprising the current root certificate 132 at the time the client device 110 is built or configured for shipping. The client device 110 also maintains access to a current time and date (such as using a clock or provided by a user), to determine if any particular root certificate 132 has expired.

The client device 110 validates any new root certificate 132 using the procedure it uses for validating an SIO 131, described with reference to FIG. 4.

Security Information Server Root Certificates

Figure 3:
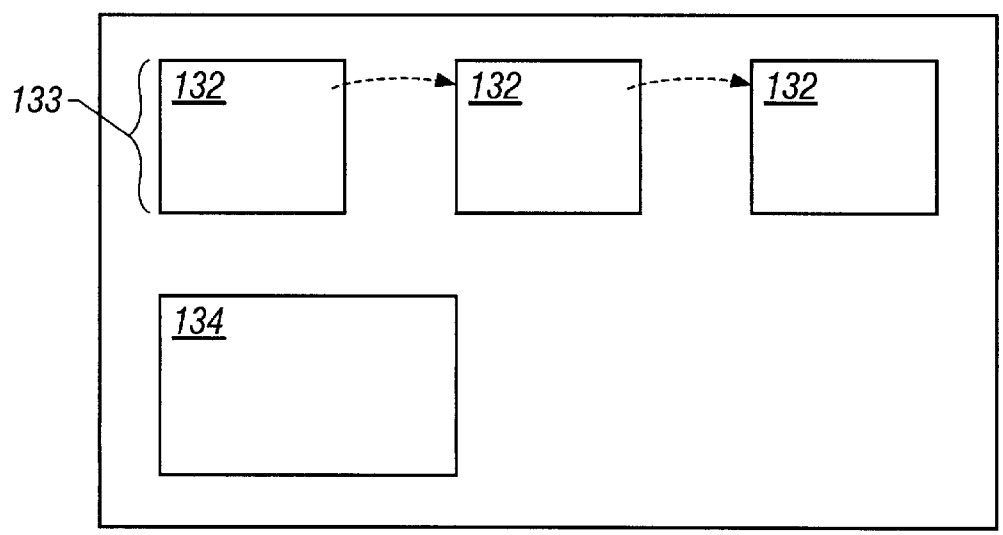
FIG. 3 shows a data block diagram of a security information object.

FIG. 3 shows a data block diagram of a security information object.

Each SIO 131 includes at least the following elements:
a sequential chain 133 of root certificates 132, including at least a starting root certificate 132 Cx and continuing in sequence to the most recently issued root certificate 132, i.e., the active root certificate;
a trust data object 134 including information about at least one certification server 120, digitally signed by the security information server 130 using the active root key pair 201.

The security information server 130 transmits an SIO 131 to each client device 110 whenever any one of the following events occurs:
the security information server 130 issues new information about one or more certification servers 120; or
the security information server 130 issues a new root certificate 132.

Method of Operation

Figure 4:
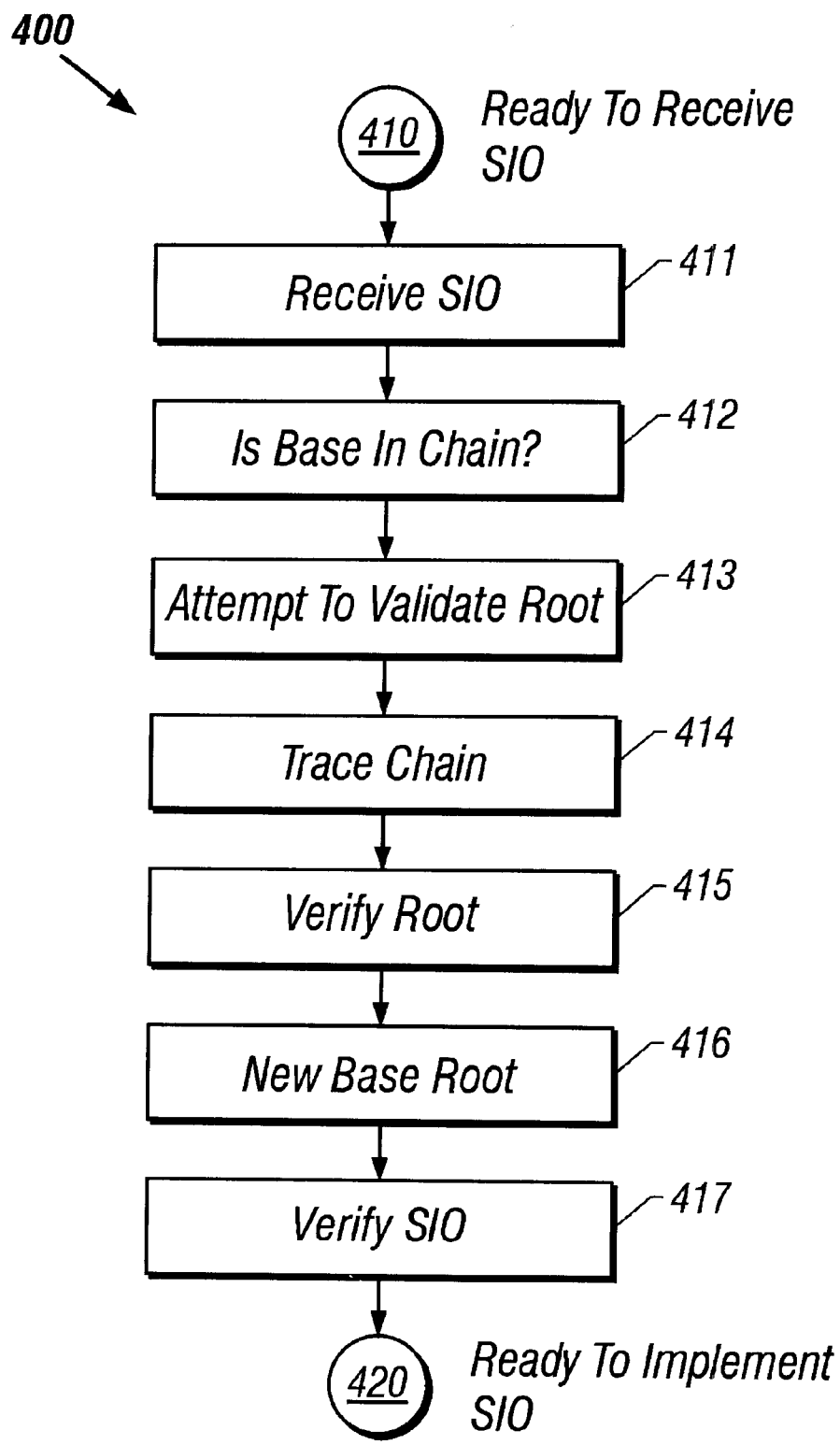
FIG. 4 shows a process flow diagram of a method for security information acquisition.

FIG. 4 shows a process flow diagram of a method for security information acquisition.

A method 400 is performed by the client device 110 to validate each SIO 131.

At a flow point 410, the client device 110 is ready to receive an SIO 131.

At a step 411, the client device 110 receives an SIO 131 and prepares to validate it.

At a step 412, the client device 110 determines if its base root certificate 221 is part of the sequential chain 133. If not, the method 400 proceeds with the step 413. If so, the method 400 proceeds with the step 414.

At a step 413, the client device 110 presumes that its base root certificate 221 immediately precedes the first root certificate 132 in the sequential chain 133. The client device 110 attempts to validate that first root certificate 132 using its own base root certificate 221. If so, the method 400 proceeds with the step 414. If not, the attempt to verify the SIO 131 fails and the method 400 reverts to the flow point 410.

At a step 414, the client device 110 traces down the sequential chain 133 to determine a most recent root certificate 132 for the security information server 130. To perform this step, the client device 110 performs the following sub-steps:

At a sub-step 414(a), the client device 110 verifies each of the digital signatures for each of the root certificates 132 in the sequential chain 133.

At a sub-step 414(b), the client device 110 verifies that each of the root certificates 132 in the sequential chain 133 is properly linked to its successor. For each root certificate 132 in the sequential chain 133, the client device 110 determines the digest 213 (or secure hash) of the public key for its successor, and verifies that the digest 213 for the successor is included in that root certificate 132.

At a step 415, the client device 110 verifies that the most recent root certificate 132 is currently valid, that is, that it has not expired.

At a step 416, the client device 110 makes the most recent (active, currently valid) root certificate 132 its new base root certificate 221. This allows the client device 110 to more quickly verify any SIO 131 it receives in the future, and protects the client device 110 against any compromised root certificates 132. However, if the client device 110 is reset or the new base root certificate 221 is corrupted, the client device 110 can revert to the base root certificate 221 stored in its permanent read-only memory.

At a step 417, the client device 110 verifies the digital signature on the trust data object 134, using the new base root certificate 221.

At a flow point 420, the client device 110 has verified the SIO 131 and implements the information in the trust data object 134.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including steps of:
maintaining a base root certificate in storage at a client; and
using said base root certificate to obtain a security information message, said security information message including a plurality of root certificates from a server wherein said plurality of root certificates forms a chain within said security information message, said security information message being obtained before verification of any of said root certificates,
said chain linking each root certificate with a next root certificate, each root certificate being usable to verify a next root certificate,
at least one root certificate being verifiable using said base root certificate,
at least one root certificate being current, each root certificate including an expiration date, and
each root certificate being digitally signed using a private key for a first key pair and including a public key for the first key pair and a secure digest of a public key for a second key pair for verifying the public key for the second key pair.

2. A method as in claim 1, wherein said security information includes a root certificate for at least one certification authority.

3. A method as in claim 1, wherein said security information includes information about at least one certification authority.

4. A method as in claim 1, wherein said security information includes a root certificate for at least one trusted entity.

5. A method as in claim 1, wherein said storage includes nonvolatile storage.

6. A method as in claim 1, wherein said storage includes sufficient storage for substantially only one said base root certificate.

7. A method as in claim 1, including steps for revoking one of said plurality of root certificates.

8. A method as in claim 7, wherein said steps for revoking said one root certificate include steps for issuing a new root certificate.

9. A method as in claim 1, including steps for using said current root certificate to verify security information at said client from said server.

10. A method as in claim 9, wherein said security information includes information about at least one trusted entity.

11. A method as in claim 10, wherein said trusted entity is a financial institution, information provider, or software publisher.

12. A system as in claim 11, wherein said trusted entity is a financial institution, information provider, or software publisher.

13. A system, including:
a client device including storage having a base root certificate; and
means for using said base root certificate to obtain a security information message, said security information message including a plurality of root certificates from a server wherein said plurality of root certificates forms a chain within said security information message, said security information message being obtained before verification of any of said root certificates, said chain linking each root certificate with a next root certificate, each root certificate being usable to verify a next root certificate, at least one root certificate being verifiable using said base root certificate, at least one root certificate being current, each root certificate including an expiration date, and each root certificate being digitally signed using a private key for a first key pair and including a public key for the first key pair and a secure digest of a public key for a second key pair for verifying the public key for the second key pair.

14. A system as in claim 13, wherein said security information includes a root certificate for at least one certification authority.

15. A system as in claim 13, wherein said security information includes information about at least one certification authority.

16. A system as in claim 13, wherein said security information includes a root certificate for at least one trusted entity.

17. A system as in claim 13, wherein said storage includes nonvolatile storage.

18. A system as in claim 13, wherein said storage includes sufficient storage for substantially only one said base root certificate.

19. A system as in claim 13, including means for revoking one of said plurality of root certificates.

20. A system as in claim 19, wherein said means for revoking said one root certificate includes means for issuing a new root certificate.

21. A system as in claim 13, including means for using said current root certificate to verify security information at said client from said server.

22. A system as in claim 21, wherein said security information includes information about at least one trusted entity.

23. In a security system, storage storing security information including:
a plurality of root certificates received in a message from a server,
wherein said plurality of root certificates forms a chain within said message, said security information being obtained before verification of any of said root certificates, said chain linking each root certificate with a next root certificate, each root certificate enabling a processor to verify a next root certificate, at least one root certificate being verifiable by the processor using a base root certificate, said base root certificate used to obtain said security information, at least one root certificate being current, each root certificate including an expiration date, and each root certificate being digitally signed using a private key for a first key pair and including a public key for the first key pair and a secure digest of a public key for a second key pair for verifying the public key for the second key pair, said security system using said current root certificate's public key to verify secure communications received from and to send secure communications to, a trusted entity.

24. Storage as in claim 23, wherein said security information includes a root certificate for at least one certification authority.

25. Storage as in claim 23, wherein said security information includes information about at least one certification authority.

26. Storage as in claim 23, wherein said security information includes a root certificate for at least one trusted entity.

27. Storage as in claim 23, wherein said storage includes non-volatile storage.

28. Storage as in claim 23, including security information from said server verifiable using said current root certificate at a client.

29. A Storage as in claim 28, wherein said security information includes information about at least one trusted entity.

30. Storage as in claim 29, wherein said trusted entity is a financial institution, information provider, or software publisher.

* * * * *